(12) United States Patent
Thijssen

(10) Patent No.: US 7,701,168 B2
(45) Date of Patent: Apr. 20, 2010

(54) UNIVERSAL SERIAL BUS CHARGER DEVICE

(75) Inventor: Jeroen Thijssen, Bara (SE)

(73) Assignee: Sony Ericsson Mobile Communications AB, Lund (SE)

( * ) Notice: Subject to any disclaimer, the term of this patent is extended or adjusted under 35 U.S.C. 154(b) by 391 days.

(21) Appl. No.: 11/752,617

(22) Filed: May 23, 2007

(65) Prior Publication Data
US 2008/0231235 A1 Sep. 25, 2008

Related U.S. Application Data

(60) Provisional application No. 60/896,710, filed on Mar. 23, 2007.

(51) Int. Cl.
H01M 10/46 (2006.01)
(52) U.S. Cl. ...................................... 320/111
(58) Field of Classification Search ................ 320/106, 320/107, 111, 112, 114, 115, DIG. 12
See application file for complete search history.

(56) References Cited

U.S. PATENT DOCUMENTS 6,791,296 B1  9/2004  Chu et al. .................. 320/114
2003/0030412 A1  2/2003  Matsuda et al.
2005/0174094 A1  8/2005  Purdy et al.
2007/0236169 A1* 10/2007  Purdy et al. ................. 320/106
2007/0278999 A1  12/2007  Hsia

FOREIGN PATENT DOCUMENTS

EP  1 691 252 A1  8/2006

OTHER PUBLICATIONS

International Search Report and Written Opinion from corresponding international application No. PCT/IB2007/053851, mailed Jan. 14, 2007, 14 pages.
Mobile Fun; USB Mains Charger Adapter; www.mobilefun.co.uk; May 23, 2007 (print date); 2 pages.
Battery Charging Specification; Revision 1.0; Mar. 8, 2007; 29 pages.

* cited by examiner

Primary Examiner—Edward Tso
(74) Attorney, Agent, or Firm—Harrity & Harrity, LLP

(57) ABSTRACT

A device may include a first connector configured to connect to a portable device and a second connector configured to connect to a power source. The device may also include circuitry configured to provide a first charging current to the portable device via the first connector when the second connector is connected to a power adapter coupled to a power outlet and provide a second charging current to the portable device via the first connector when the second connector is connected to a universal serial bus port of a host device.

18 Claims, 7 Drawing Sheets

UNIVERSAL SERIAL BUS CHARGER DEVICE

RELATED APPLICATION

This application claims priority under 35 U.S.C. §119 based on U.S. Provisional Application No. 60/896,710, filed Mar. 23, 2007, the disclosure of which is hereby incorporated herein by reference.

TECHNICAL FIELD OF THE INVENTION

The invention relates generally to portable devices and, more particularly, to charging a portable device.

DESCRIPTION OF RELATED ART

Communication devices, such as mobile terminals, have become increasingly important in every day life. For example, communications devices are typically used at work and at home to place and receive phone calls, to send and receive text messages, to browse the Internet, etc. As a result, keeping these devices charged and available for use is very important to users.

SUMMARY

According to a first aspect, a cable for charging a device is provided. The cable includes a first connector configured to connect to a universal serial bus (USB) port of a host device or a power adapter coupled to a power outlet, the first connector comprising a plurality of pins, wherein a first pin is configured to receive power from the USB port of the host device or the power adapter. The cable also includes a charging enabler coupled to the first connector, the charging enabler comprising at least one transistor coupled to the first pin of the first connector, wherein the charging enabler is configured to enable charging of the device based on a voltage applied between the first pin of the first connector and a data pin of the first connector. The cable further includes a second connector coupled to the charging enabler and configured to provide power to the device via the charging enabler.

Additionally, the charging enabler may further comprise a first resistor coupled to the first pin, and a second resistor coupled to the first resistor and to the data pin of the first connector.

Additionally, the transistor may be coupled to the first and second resistors, and the charging enabler may be configured to provide a first charging current to the device when the first connector receives power from the power adapter.

Additionally, the cable may further comprise a current limiter connected in parallel with the transistor and configured to provide a second charging current to the device when the first connector receives power from the USB port of the host device, the second charging current being less than the first charging current.

Additionally, the second resistor may be connected between a gate of the transistor and the data pin of the first connector, the transistor being configured to close when at least a first voltage is present on the gate of the transistor.

Additionally, the first voltage may be present when the first connector is receiving power from the adapter.

Additionally, the cable may further comprise a third resistor coupled between a ground pin of the first connector and a second data pin of the first connector.

Additionally, the first resistor may have a nominal value of approximately 2700 ohms and the second resistor may have a nominal value of approximately 4700 ohms.

Additionally, the charging enabler may further comprise a first resistor coupled to the first pin, and a zener diode coupled to the first resistor and the data pin of the first connector.

Additionally, the first connector may comprise a male USB type A connector that mates with the USB port of the host device or the power adapter and the second connector may be configured to mate with a USB type B connector of the device.

According to another aspect, a device is provided. The device includes a first connector configured to connect to a portable device and a second connector configured to connect to a universal serial bus (USB) port of a host device or a power adapter coupled to a power outlet, wherein a first pin of the second connector is configured to receive power from the USB port of the host device or the power adapter. The device also includes circuitry coupled to the first pin of the second connector. The circuitry is configured to provide a first charging current to the portable device via the first connector when the second connector is connected to the power adapter, and provide a second charging current to the portable device via the first connector when the second connector is connected to the USB port of the host device, the second charging current being less than the first charging current.

Additionally, the circuitry may comprise a first resistor coupled to the first pin of the second connector, and at least one of a second resistor or a zener diode coupled to the first resistor and to a second pin of the second connector.

Additionally, the at least one of a second resistor or a zener diode may comprise a second resistor.

Additionally, the first resistor may have a value of approximately 2700 ohms and the second resistor may have a value of approximately 4700 ohms.

Additionally, the circuitry may further comprise a switch coupled to the first resistor and to the at least one of the second resistor or the zener diode, the switch being configured to close when voltage supplied to the switch exceeds a threshold value.

Additionally, the switch may comprise a transistor, the transistor being configured to close when a voltage on a gate of the transistor exceeds the threshold value, wherein current is provided from the first pin of the second connector through the closed transistor to the portable device Additionally, the first pin of the second connector may correspond to a voltage input pin and the second pin of the second connector may correspond to a first data pin. The device may further comprise a third resistor coupled between a ground pin of the second connector and a second data pin of the second connector.

Additionally, the at least one of a second resistor or a zener diode may comprise a zener diode having a rating of approximately three volts.

Additionally, the first connector may be configured to mate with a USB type B connector of the portable device and the second connector may comprise a male USB type A connector that mates with the USB port of the host device or the power adapter.

Additionally, the circuitry may be included on a printed circuit board.

According to still another aspect, a system is provided. The system includes means for connecting the system to one of a plurality of power sources, a first one of the plurality of power sources comprising a universal serial bus (USB) host device and a second one of the plurality of sources comprising a power adapter coupled to a power outlet. The system also includes means for providing a first current from the USB host device when the means for connecting is connected to the USB host device. The system further includes means for providing a second current from the power adapter when the system is connected to the power adapter, the second current being greater than the first current.

Additionally, the means for connecting does not include a USB transceiver.

According to yet another aspect, a device is provided. The device comprises a connector configured to connect to a universal serial bus (USB) port of a host device or a power adapter coupled to a power outlet, wherein a first pin of the connector is configured to receive power from the USB port of the host device or the power adapter. The device also includes circuitry coupled to the first pin of the connector. The circuitry is configured to provide a first charging current to the device when the connector is connected to the power adapter, and provide a second charging current to the device when the connector is connected to the USB port of the host device, the second charging current being less than the first charging current.

Additionally, the device may comprise a mobile terminal.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

Figure 1:
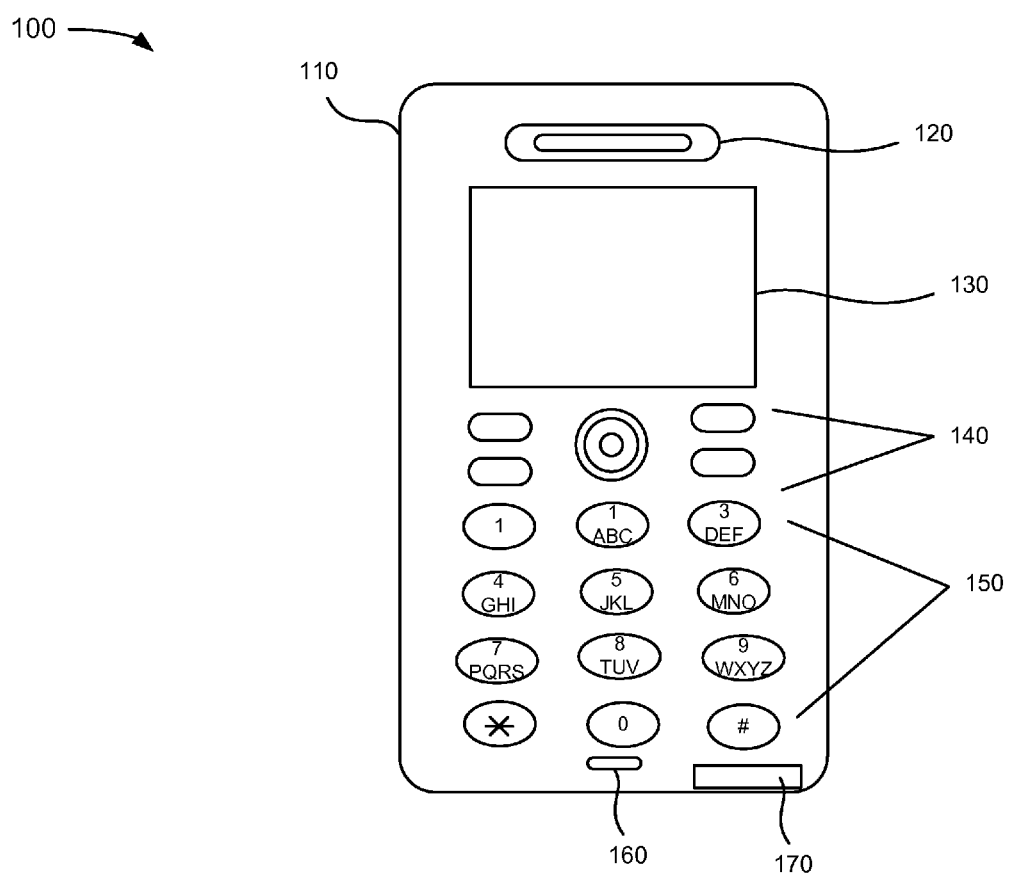
FIG. 1 is a diagram of an exemplary communication device.

FIG. 1 is a diagram of an exemplary communication device 100 which may be used in conjunction with systems and methods described herein. In an exemplary implementation, communication device 100 may be a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Referring to FIG. 1, communication device 100 may include housing 110, speaker 120, display 130, control buttons 140, keypad 150, microphone 160 and connector 170. Housing 110 may protect the components of communication device 100 from outside elements. Speaker 120 may provide audible information to a user of communication device 100.

Display 130 may provide visual information to the user. For example, display 130 may provide information regarding incoming or outgoing telephone calls and/or incoming or outgoing electronic mail (e-mail), instant messages, short message service (SMS) messages, etc. Control buttons 140 may permit the user to interact with communication device 100 to cause communication device 100 to perform one or more operations, such as place a telephone call, play various media, etc. For example, control buttons 240 may include a dial button, hang up button, play button, etc. Keypad 150 may include a standard telephone keypad. Microphone 160 may receive audible information from the user.

Connector 170 may be a connector or interface used for charging communication device 100. In an exemplary implementation, connector 170 may be accessible from the exterior of communication device 100. In one implementation, connector 170 may be conventional universal serial bus (USB) type B connector. In other implementations, connector 170 may be a proprietary connector compatible with the particular communication device 100. Connector 170 is shown on the front of communication device 100. In other implementations, connector 170 may be located on the bottom of communication device 100, on the backside of communication device 100, on either side of communication device 100 or on any other portion of communication device 100.

In some implementations, communication device 100 may be a device that includes no USB transceiver. In this case, a cable and/or circuitry may be used to charge communication device 100 without the use of a USB transceiver, as described in detail below. The cable in this case may connect to a charging port of communication device 100, as opposed to a USB transceiver port.

Aspects of the invention are described herein in the context of charging and/or powering a portable device, such as communication device 100. It should also be understood that systems and methods described herein may also be implemented in other devices that may require charging, such as a personal computer (PC), a laptop computer, a PDA, a media playing device (e.g., an MPEG audio layer 3 (MP3) player, a video game playing device), etc., that does not include various communication functionality for communicating with other devices.

Figure 2:
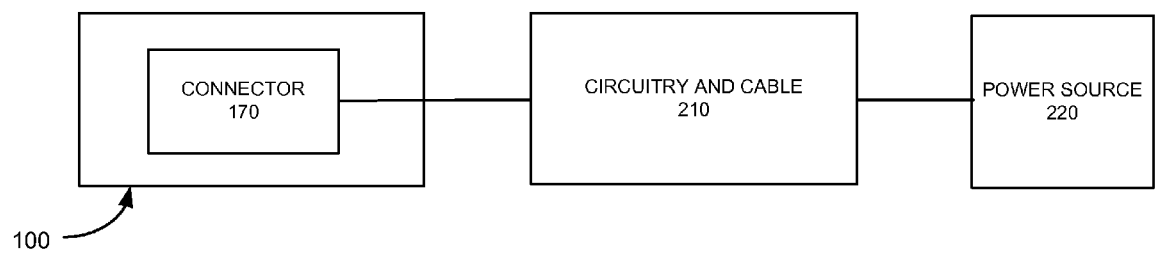
FIG. 2 is a block diagram of a device used to charge the communication device of FIG. 1 according to an exemplary implementation.

FIG. 2 is a block diagram illustrating communication device 100 coupled to a power source for powering and/or charging communication device 100 according to an exemplary implementation. Referring to FIG. 2, connector 170 of communication device 100 may be coupled to circuitry and cable 210, also referred to herein as cable 210. Cable 210 may also be coupled to power source 220.

In an exemplary implementation, cable 210 may include circuitry for detecting whether cable 210 is connected to a powered USB host device or whether cable 210 is connected to other power sources, such as a wall outlet via, for example, a power adapter device. That is, cable 210 may include circuitry that detects whether power source 220 is a powered USB host device or another power source, such as a wall outlet power adapter that may be coupled to cable 210. Based on the particular type of power source 220, cable 210 may provide a first charging current (e.g., 100 milliamps or less) or a second charging current (e.g., up to 1.8 amps or more) to communication device 100. In either case, communication device 100 may receive adequate power for charging and/or operating, as described in detail below. In addition, in implementations in which communication device 100 does not include a USB transceiver, one end of cable 210 may connect to a charging port of the communication device 100 and the other end of cable 210 may connect to a USB port of a USB host device or an adapter device that plugs into a power outlet. In these cases, cable 210 ensures that communication device 100 draws no more current from the USB host device that what is allowable for charging from the USB host device or draws a higher charging current from the power adapter device.

Power source 220, as described above, may represent a power source from which communication device 100 may be powered or charged. In an exemplary implementation, power source 220 may be a host device, such as a laptop computer, PC or some other device that may act as a hub to power a peripheral device, such as communication device 100. That is, power source 220 may a host device through which communication device 100 may be charged.

In another implementation, power source 220 may be associated with conventional building power that is provided via a plug or receptacle that connects to, for example, a wall outlet. In this case, a power adapter, such as an alternating current (AC) to direct current (DC) adapter may plug into the wall outlet and convert AC power to DC power. The AC-to-DC (AC/DC) adapter may also include a connector for received one end of cable 210 to allow communication device 100 to be charged. In this implementation, for descriptive purposes, the AC/DC adapter may be considered to be part of power source 220. In each case, cable 210 ensures that communication device 100 is able to draw an appropriate charging current, as described in detail below.

Figure 3A:
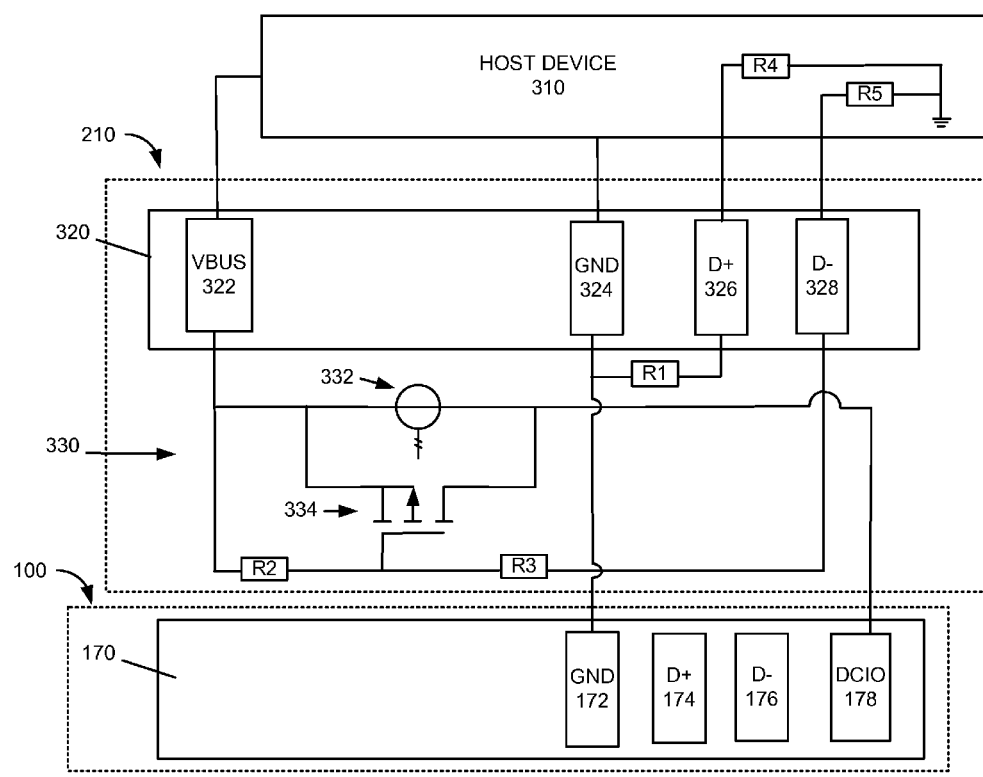
FIGS. 3A and 3B are block diagrams illustrating exemplary scenarios in which the device of FIG. 2 may be used to charge the communication device of FIG. 1.

FIG. 3A illustrates an exemplary detailed diagram of cable 210 coupled to connector 170 and a host device 310 (also referred to herein as hub 310), according to a first implementation. Assume that host device 310 is a powered device that acts as a power source (i.e., power source 220) for charging and/or powering communication device 100. Hub 310 may be a laptop computer, a USB hub or another device from which communication device 100 may receive power and/or be charged. In some instances, communication device 100 may connect to hub 310 via a USB type cable that includes circuitry for ensuring the proper charging current is provided to communication device 100, as described in detail below.

Referring to FIG. 3A, the elements shown in the dotted box may correspond to components included in cable 210. In other implementations, one or more of these components may be located externally with respect to cable 210. Cable 210 may include connector 320 and circuitry 330. Connector 320 may include, for example, a male USB type A connector with, for example, four pins. Alternatively, connector 320 may include a proprietary cable compatible with a particular hub 310 and/or communication device 100. In FIG. 3A, Vbus pin 322 may correspond to a pin for receiving an input voltage from hub 310, ground (GND) pin 324 may correspond to a ground pin, D+ pin 326 may correspond to a data to mobile station (DTMS) pin (e.g., data output) and D− pin 328 may correspond to a data from mobile station (DFMS) pin (e.g., data input).

Resistor R1 in FIG. 3A may be connected between the ground pin 324 and D+ pin 326 of connector 320. In an exemplary implementation, resistor R1 may have a nominal value of 50 ohms. Resistor R1 may be used, for example, to protect communication device 100 from short circuiting the output.

Circuitry 330 acts as a charging enabler to provide a proper charging current to communication device 100, based on the particular circumstances. In an exemplary implementation, circuitry 330 may include a current limiter 332 and a transistor (e.g., a field effect transistor (FET)) 334 connected in parallel to current limiter 332. Current limiter 332 may limit current provided by hub 310 and flowing through current limiter 332 to approximately 100 milliamps (mA). In other instances, current flowing through current limiter 332 may be limited to other values, such as 2.5 mA, 500 microamps (µA), etc., based on the particular circumstances and the particular host device 310. In an exemplary implementation, current limiter 332 may include one or more resistors selected to limit the current to the desired amount. Alternatively, current limiter 332 may include other conventional components used to limit the current to the desired amount. In still other implementations, current limiter 332 may not be included in circuitry 330.

Transistor 334 may be used to provide power from hub 310 that bypasses current limiter 332, as described in detail below. That is, transistor 334 may act as a switch that may be closed to provide power from a power source 220 such that current limiter 332 may be bypassed, as described in detail below. Transistor 334 is illustrated in FIG. 3A as an FET. It should be understood that other types of transistors, such as bipolar junction transistors (e.g., PNP type transistors, NPN type transistors, Darlington transistors, etc.), or other types of transistors or switching devices may be used for transistor 334.

Circuitry 330 may also include two resistors, labeled R2 and R3 in FIG. 3A. Resistors R2 and R3 may be connected from Vbus pin 322 of connector 320 to D− pin 328 of connector 320. In an exemplary implementation, resistors R2 and R3 may have nominal values of 2700 ohms and 4700 ohms, respectively. These values for resistors R2 and R3 may range from their nominal values by approximately plus or minus 5%. It should be understood that in other implementations, resistors R2 and R3 may have other nominal values based on the particular circumstances, such that resistors R2 and R3 aid in providing the desired voltages to transistor 334. In addition, in one alternative implementation, a zener diode having a rating of, for example, three volts may be used instead of resistor R3.

Host 310 may include resistors R4 and R5. In an exemplary implementation, the nominal values of resistors R4 and R5 may range from 14,000 ohms to 24,000 ohms. Resistors R4 and R5 may connect to D+ pin 326 and D− pin 328, respectively. Resistors R4 and R5 are also connected to ground, as illustrated in FIG. 3A. Resistors R4 and R5 may act as pull down resistors to limit voltage on D+ pin 326 and D− pin 328.

Cable 210 may also include a connector (not shown) that connects cable 210 to communication device 100 via connector 170. As described previously, connector 170 may be a USB type B connector. In this case, connector 170 may include ground (GND) pin 172, D+ pin 174, D− pin 176 and direct current input/output (DCIO) pin 178. Cable 210 may include a corresponding connector (e.g., a USB connector) that mates with the USB type B connector 170 of communication device 100. In other instances, cable 210 may include a proprietary cable that mates with connector 170 of communication device 100.

Cable 210 may operate to provide power to communication device 100, as described in detail below. In the implementation illustrated in FIG. 3A, power source 220 in FIG. 2 may correspond to host device 310 (e.g., host device 310 may be a charged device with a battery that may supply power to communication device 100) or power source 220 may provide power to host device 310, which may include a USB port. In either case, power may be supplied from host device 310 to charge and/or operate communication device 100. In other implementations, cable 210 may be used to power communication device 100 from other power sources.

Figure 3B:
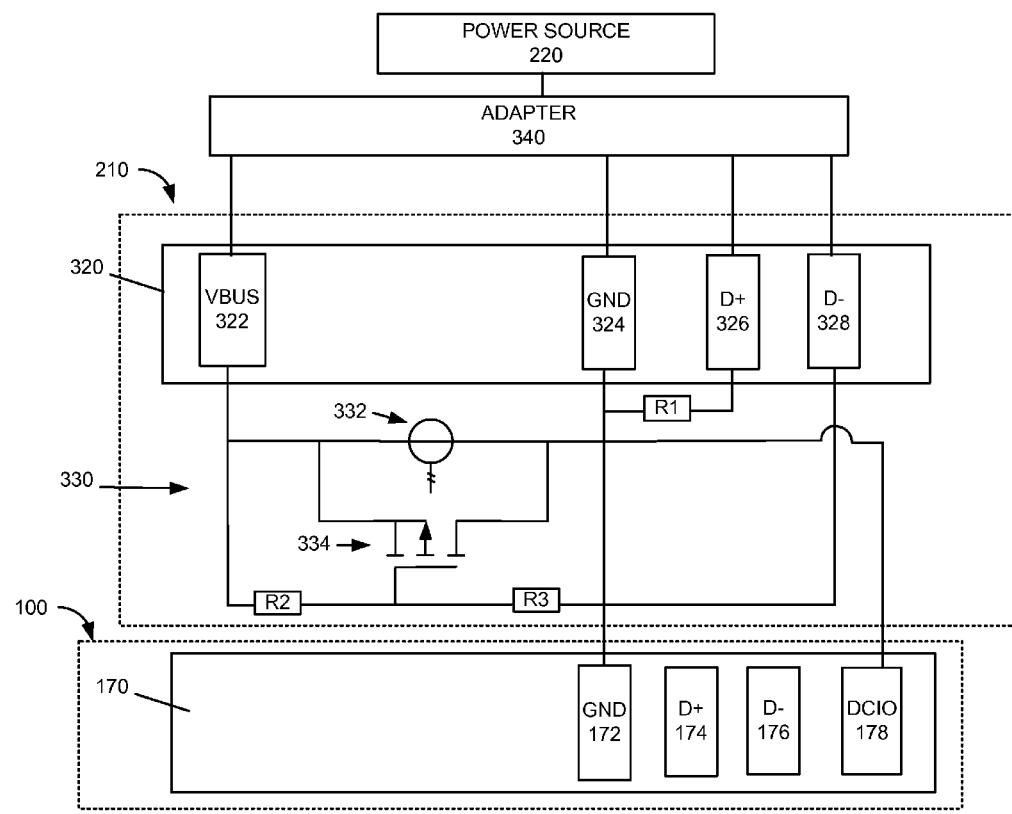

For example, FIG. 3B illustrates an exemplary implementation in which power source 220 is a non-USB hub device. In this implementation, power source 220 may represent power from, for example, a conventional wall outlet. In some instances, the power source 220 may be coupled to cable 210 via an adapter, such as adapter 340 illustrated in FIG. 3B. In this case, adapter 340 may be a device configured to receive a male USB type A connector (e.g., connector 320) and plug into a power outlet (e.g., a wall outlet). Adapter 340 may convert alternating current (AC) provided via a conventional power outlet to direct current (DC) that may be used to charge communication device 100. That is, adapter 340 may be an AC/DC adapter. Such adapters are conventional and will not be described further herein. The other elements in FIG. 3B are the same or similar to the elements discussed above with respect to FIG. 3A. In the implementation of FIG. 3B, however, no pull down resistors, such as resistors R4 and R5 associated with a powered hub 310 are present. In this implementation, D+ pin 326 and D− pin 328 of connector 320 may be effectively jumpered or shorted together when connector 320 is connected to adapter 340. For example, the pins in adapter 340 that correspond to D+ pin 326 and D− pin 328 of connector 320 may be shorted together, thereby effectively shorting D+ pin 326 and D− pin 328 of connector 320 together.

The implementation illustrated in FIG. 3B may be particularly useful for charging communication device 100 when no USB host device is available for charging communication device 100. In addition, in this implementation, cable 210 may be used in conjunction with a communication device 100 that includes no USB transceiver. In either case, cable 210 may provide power from power source 220 without the use of proprietary connectors. That is, conventional connectors may be used to connect cable 210 to adapter 340/power source 220 and communication device 100.

Figure 4:
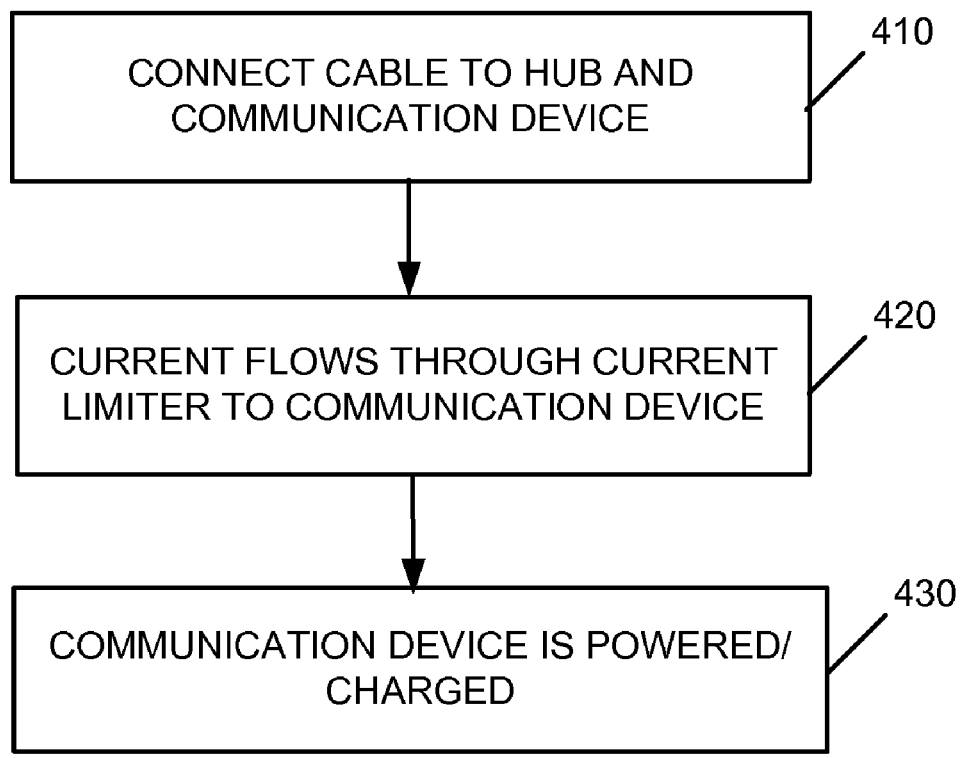
FIGS. 4 and 5 illustrate exemplary processing associated with charging the communication device of FIG. 1.

FIG. 4 is a flow diagram illustrating exemplary processing associated with charging communication device 100 in the scenario illustrated in FIG. 3A. Processing may begin when a user wishes to charge or power communication device 100 from hub 310. As described previously, hub 310 may be a laptop computer, personal computer or another device that includes a USB port. The user may connect one end of cable 210 to the USB port of hub 310 and the other end of cable 210 to connector 170 of communication device 100 (act 410). As described above, assume that hub 310 includes pull down resistors R4 and R5 that are coupled to D+ pin 326 and D− pin 328 of connector 320. Further assume that the maximum voltage permitted on D+ pin 326 and D− pin 328 is approximately 3.6 volts. In this case, connecting D+ pin 326 and/or D− pin 328 directly to Vbus pin 322 of connector 320 would result in the voltage on these pins exceeding their maximum rating.

Circuitry 330, as discussed above, includes pull up resistors R2 and R3 that are connected in series to D− pin 328 of connector 320. Therefore, when voltage is supplied to Vbus pin 322 from hub 310, the voltage on the gate of transistor 334 is not sufficient to allow current to flow through transistor 334. Therefore, when host device 310 is powered, current from host device 310 flows through current limiter 332 and is supplied to DCIO pin 178 of connector 170 (act 420). DCIO pin 178 may be configured to receive power to charge communication device 100. Communication device 100 may then be powered and/or charged by host device 310 (act 430). In this scenario, the charging current may be limited to the particular current limiter 332. For example, as described above, in one implementation, current limiter 332 may limit the charging current to 100 mA. This relatively low charging current may be adequate for various scenarios in which the amount of time associated with charging communication device 100 is not critical. In other implementations, current limiter 332 may limit the current to other values, such as 2.5 mA, 500 μA, etc., based on the particular host device 310 and the particular circumstances.

In addition, as described above, in some implementations, current limiter 332 may not be included in circuitry 330. In these cases, current to communication device 100 may be limited based on the particular current provided by host device 310. In addition, in instances when communication device 100 does not include a transceiver port, cable 210 may act to limit the charging current to the proper amount (e.g., 100 mA). That is, cable 210 ensures that communication device 100 draws no more current from the host 310 than allowable when connecting to USB hub devices.

Figure 5:
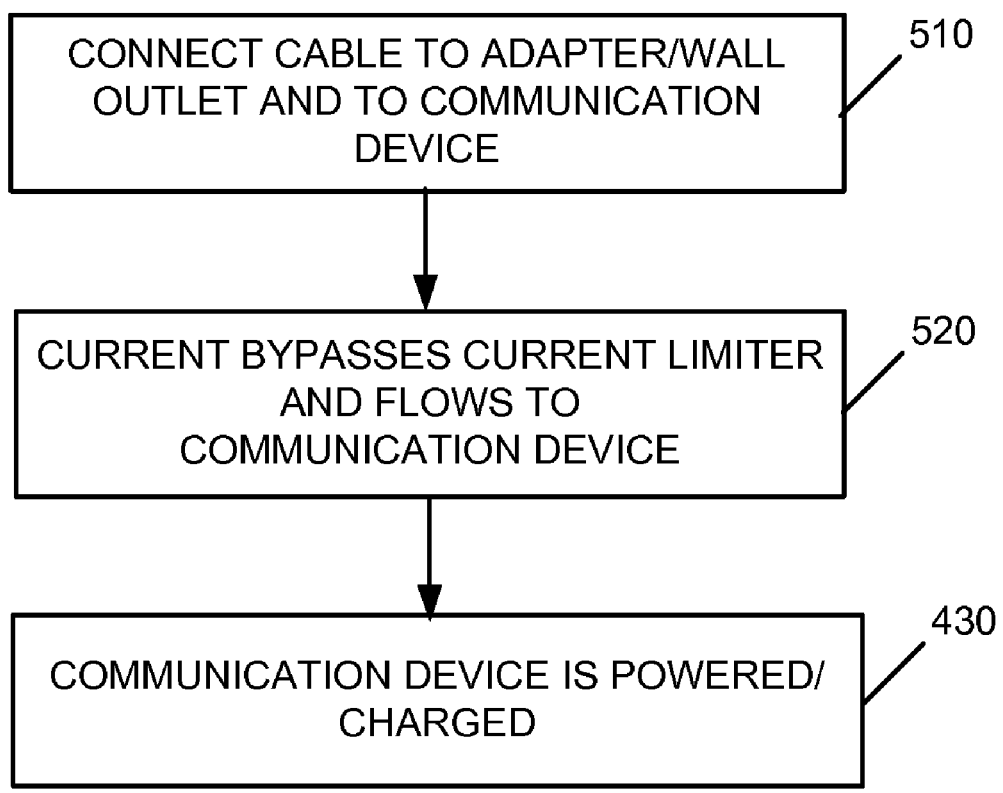

FIG. 5 is a flow diagram illustrating exemplary processing associated with charging communication device 100 in the scenario illustrated in FIG. 3B. Processing may begin when a user wishes to charge communication device from a non-USB hub device, such as via a wall outlet. In this case, adapter 340 that includes an AC/DC converter that plugs into a power outlet may be used to facilitate the charging. For example, as described previously, adapter 340 may plug into a wall outlet and may also include a connector that receives, for example, a male USB type A connector. In this scenario, assume that one end of cable 210 (e.g., connector 320) includes a male USB type A connector. Therefore, the user may connect the USB type A connector into adapter 340, which is then plugged into a conventional outlet (e.g., a wall outlet) (act 510). The user may also connect the other end of cable 210 to connector 170 of communication device 100 (act 510). As discussed above, connector 170 may be a USB transceiver port or a charging port on communication device 100.

Referring to FIG. 3B, adapter 340 and/or power source 220 includes no pull down resistors. That is, since power source 220 is a conventional wall outlet and is not a USB hub device, pull down resistors are not included in this scenario. In an exemplary implementation, D+ and D− pins in the female USB connector included in adapter 340 may be shorted together. As a result, D+ pin 326 and D− pin 328 of connector 320 may be effectively shorted when connector 320 is connected to adapter 340. In an exemplary implementation, when cable 210 is connected to power source 220 via adapter 340, voltage may be supplied to Vbus pin 322 of connector 320.

In an exemplary implementation, when voltage is supplied from power source 220 to Vbus pin 322 via adapter 340, the voltage on the gate of transistor 334 may be approximately 1.75 volts. This voltage, along with a voltage applied to a source of transistor 334 via Vbus pin 322, may be sufficient to allow current to flow through transistor 334, thereby bypassing current limiter 332 (act 520). That is, transistor 334 may effectively operate as a closed switch. As a result, power supplied to Vbus pin 322 of connector 320 allows current to flow through the closed switch (e.g., transistor 334) to DCIO pin 178 of connector 170 without being limited by current limiter 332.

As described previously, resistors R2 and R3 may have nominal values of approximately 2700 ohms and 4700 ohms, respectively. In this scenario, providing resistors having these nominal values enables cable 210 to provide the desired voltage to transistor 334 to control transistor 334 to allow the desired charging current to be supplied to communication device 100 when power source 220 is a power outlet and to also limit the current to communication device 100 when power source is a host device (i.e., host device 310 in FIG. 3A). That is, resistors R2 and R3 operate to provide the appropriate voltages on the gate and/or source of transistor 334 to effectively operate transistor 334 as an open or closed switch. This allows the appropriate charging current to be provided to communication device 100 based on the particular power source 220 being used to charge communication device 100.

In an exemplary implementation, DCIO pin 178 of communication device 100 may receive approximately 2.5 amps of charging current when cable 210 is connected to power source 220 via adapter 340. In situations where communication device 100 does not include a USB transceiver, the charging current (e.g., 2.5 amps in this scenario) may be provided to a charging port on communication device 100, as opposed to a USB transceiver port. That is, DCIO port 178 of communication device 100 may be associated with a USB transceiver or a charging port that is not part of a USB transceiver.

In either case, communication device 100 may then be powered and/or charged by current from power source 220 that bypasses current limiter 332 (act 530). This may allow communication device 100 to be charged much more quickly than in conventional scenarios.

As discussed above, cable 210 may include circuitry for effectively distinguishing between a connection to a USB hub, such as host device 310, and a power source, such as a power outlet/wall outlet. In the case of a USB hub, the circuitry in cable 210 provides the proper charging current permitted by the USB host device (e.g., 100 mA). In the case of a power outlet/wall outlet connected to communication device 100 via adapter 340, the circuitry in cable 210 provides a higher charging current (e.g., up to 2.5 A or more) for more quickly charging communication device 100. The particular charging current in each of these scenarios may depend on, for example, the particular country/power standard for various countries. In each scenario, an appropriate charging current is provided to communication device 100.

In the implementations described above, cable 210 has been described as being a stand alone component that includes circuitry (e.g., circuitry 330) for providing the appropriate charging current to a conventional communication device 100. In other implementations, all or a portion of the components of cable 210 may be located in other devices. For example, in an exemplary implementation, all or some of the components illustrated as being part of the charging enabling circuitry (e.g., current limiter 332, transistor 334, resistors R1, R2 and R3) may be included in communication device 100. In this case, a conventional USB type cable with a male USB type A connector for connecting to power source 220 and a connector for connecting to communication device 100 (e.g., a USB type B connector) may be used to connect communication device 100 to power source 220. In other words, all (or some) of the circuitry used to enable charging of communication device 100 via host device 310 or via adapter 340 may be included in the device (e.g., communication device 100) being charged.

Figure 6:
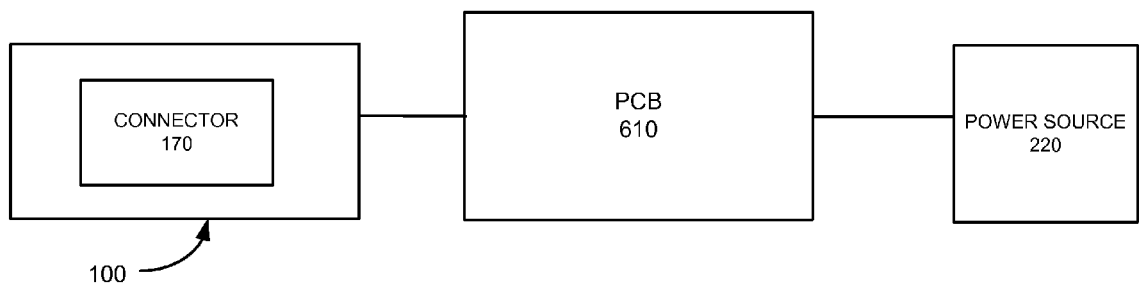
FIG. 6 is a block diagram of a device used to charge the communication device of FIG. 1 according to another exemplary implementation.

In still another implementation, all or some of the components illustrated in cable 210 may be included on a printed circuit board (PCB). For example, FIG. 6 illustrates an implementation in which all or some of the circuitry described above may be included on a PCB. Referring to FIG. 6, connector 170 of communication device 100 may connect to PCB 610, which connects to power source 220. In this implementation, all or some of the components illustrated as being part of circuitry 330 (e.g., current limiter 332, transistor 334, resistors R1, R2 and R3) may be included on PCB 610 as opposed to cable 210. In this implementation, unwanted resistance associated with a cable connection (i.e., cable 210) may be reduced and/or eliminated via the use of PCB 610. That is, a relatively short cable may connect connector 170 to PCB 610. PCB 610 may then connect to power source 220 using, for example, a male USB type A connector. In this case, unwanted resistance associated with the physical length of cable 210 may be reduced by using PCB 610 to connect communication device 100 to power source 220.

CONCLUSION

Implementations described herein provide for efficient charging of a device using powered hub devices and conventional power outlets. This enables for faster charging in certain scenarios, while still allowing the device to be charged via a hub device in other scenarios.

In addition, implementations described herein enable a device to be charged via a USB port with little to no risk of drawing too much current or overloading the USB host device. Advantageously, the device may also be charged via a USB hub device or conventional power adapter connected to a power outlet without requiring the device to include a USB transceiver. This may save considerable cost associated with providing a USB transceiver, a USB processor and/or various memory resources associated with a USB transceiver.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects described herein focus on use of USB type connections that couple a portable device, such as communication device 100, to a power source. In other instances (and as described above), connectors that are not USB type connectors may be used to connect to communication devices and/or power sources that do not include USB transceivers. In addition, these connectors may be conventional connectors.

In addition, the exemplary implementations described above refer to particular circuitry, such as current limiters, resistors, transistors, zener diodes, etc., that have particular values and/or ratings. It should be understood that these components may have other values and/or ratings in other implementations and/or other components may be used in alternative implementations to provide similar functionality.

Further, while series of acts have been described with respect to FIGS. 4 and 5, the order of the acts may be varied in other implementations consistent with the invention. Moreover, non-dependent acts may be performed in parallel.

It will also be apparent to one of ordinary skill in the art that aspects of the invention, as described above, may be implemented in, for example, computer devices, cellular communication devices/systems, methods, and/or computer program products. Accordingly, the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A cable for charging a device, comprising:
a first connector to connect to a universal serial bus (USB) port of a host device or a power adapter coupled to a power outlet, the first connector comprising a plurality of pins, where a first pin is to receive power from the USB port of the host device or the power adapter;
a charging enabler coupled to the first connector, the charging enabler comprising at least one transistor coupled to the first pin of the first connector, where the charging enabler is to enable charging of the device based on a voltage applied between the first pin of the first connector and a data pin of the first connector; and
a second connector coupled to the charging enabler and to provide power to the device via the charging enabler,
where the charging enabler further comprises:
a first resistor coupled to the first pin, and
a second resistor coupled to the first resistor and to the data pin of the first connector, and
where one of the at least one transistor is coupled to the first and second resistors, the charging enabler being to provide a first charging current to the device when the first connector receives power from the power adapter.

2. The cable of claim 1, further comprising:
a current limiter connected in parallel with the at least one transistor and to provide a second charging current to the device when the first connector receives power from the USB port of the host device, the second charging current being less than the first charging current.

3. The cable of claim 1, further comprising:
a third resistor coupled between a ground pin of the first connector and a second data pin of the first connector.

4. The cable of claim 1, where the first resistor has a nominal value of approximately 2700 ohms and the second resistor has a nominal value of approximately 4700 ohms.

5. The cable of claim 1, where the first connector comprises a male USB type A connector that mates with the USB port of the host device or the power adapter and the second connector is to mate with a USB type B connector of the device.

6. A cable for charging a device, comprising:
a first connector to connect to a universal serial bus (USB) port of a host device or a power adapter coupled to a power outlet, the first connector comprising a plurality of pins, where a first pin is to receive power from the USB port of the host device or the power adapter;
a charging enabler coupled to the first connector, the charging enabler comprising at least one transistor coupled to the first pin of the first connector, where the charging enabler is to enable charging of the device based on a voltage applied between the first pin of the first connector and a data pin of the first connector; and
a second connector coupled to the charging enabler and to provide power to the device via the charging enabler,
where the charging enabler further comprises:
a first resistor coupled to the first pin, and
a second resistor coupled to the first resistor and to the data pin of the first connector, and
where the second resistor is connected between a gate of one of the at least one transistor and the data pin of the first connector, the one of the at least one transistor being to close when at least a first voltage is present on the gate of the one of the at least one transistor.

7. The cable of claim 6, where the first voltage is present when the first connector is receiving power from the adapter.

8. A cable for charging a device, comprising:
a first connector to connect to a universal serial bus (USB) port of a host device or a power adapter coupled to a power outlet, the first connector comprising a plurality of pins, where a first pin is to receive power from the USB port of the host device or the power adapter;
a charging enabler coupled to the first connector, the charging enabler comprising at least one transistor coupled to the first pin of the first connector, where the charging enabler is to enable charging of the device based on a voltage applied between the first pin of the first connector and a data pin of the first connector; and
a second connector coupled to the charging enabler and to provide power to the device via the charging enabler,
where the charging enabler further comprises:
a first resistor coupled to the first pin, and
a zener diode coupled to the first resistor and the data pin of the first connector.

9. The cable of claim 8, where the zener diode has a rating of approximately three volts.

10. A device, comprising:
a first connector to connect to a portable device;
a second connector to connect to a universal serial bus (USB) port of a host device or a power adapter coupled to a power outlet, where a first pin of the second connector is to receive power from the USB port of the host device or the power adapter; and
circuitry coupled to the first pin of the second connector, the circuitry being to:
provide a first charging current to the portable device via the first connector when the second connector is connected to the power adapter, and
provide a second charging current to the portable device via the first connector when the second connector is connected to the USB port of the host device, the second charging current being less than the first charging current,
where the circuitry comprises:
a first resistor coupled to the first pin of the second connector, at least one of a second resistor or a zener diode coupled to the first resistor and to a second pin of the second connector, and a switch coupled to the first resistor and to the at least one of the second resistor or the zener diode, the switch being to close when voltage supplied to the switch exceeds a threshold value.

11. The device of claim 10, where the at least one of a second resistor or a zener diode comprises a second resistor.

12. The device of claim 11, where the first resistor has a value of approximately 2700 ohms and the second resistor has a value of approximately 4700 ohms.

13. The device of claim 10, where the switch comprises a transistor, the transistor being to close when a voltage on a gate of the transistor exceeds the threshold value, where current is provided from the first pin of the second connector through the closed transistor to the portable device.

14. The device of claim 10, where the first pin of the second connector corresponds to a voltage input pin and the second pin of the second connector corresponds to a first data pin, the device further comprising:

a third resistor coupled between a ground pin of the second connector and a second data pin of the second connector.

15. The device of claim 10, where the first connector is to mate with a USB type B connector of the portable device and the second connector comprises a male USB type A connector that mates with the USB port of the host device or the power adapter.

16. The device of claim 10, where the circuitry is included on a printed circuit board.

17. A device, comprising:

a first connector to connect to a portable device;

a second connector to connect to a universal serial bus (USB) port of a host device or a power adapter coupled to a power outlet, where a first pin of the second connector is to receive power from the USB port of the host device or the power adapter; and circuitry coupled to the first pin of the second connector, the circuitry being to:

provide a first charging current to the portable device via the first connector when the second connector is connected to the power adapter, and provide a second charging current to the portable device via the first connector when the second connector is connected to the USB port of the host device, the second charging current being less than the first charging current, where the circuitry comprises:

a first resistor coupled to the first pin of the second connector, and a zener diode coupled to the first resistor and to a second pin of the second Connector, the zener diode having a rating of approximately three volts.

18. The device of claim 17, where the first connector is to mate with a USB type B connector of the portable device and the second connector comprises a male USB type A connector that mates with the USB port of the host device or the power adapter.

* * * * *